(12) United States Patent
Lee et al.

(10) Patent No.: US 11,328,125 B2
(45) Date of Patent: May 10, 2022

(54) METHOD AND SERVER FOR TEXT CLASSIFICATION USING MULTI-TASK LEARNING

(71) Applicant: Korea University Research and Business Foundation, Seoul (KR)

(72) Inventors: Sang Keun Lee, Seoul (KR); Kang-Min Kim, Seoul (KR); Jungho Lee, Seoul (KR)

(73) Assignee: Korea University Research and Business Foundation, Seoul (KR)

(*) Notice: Subject to any disclaimer, the term of this patent is extended or adjusted under 35 U.S.C. 154(b) by 253 days.

(21) Appl. No.: 15/931,216

(22) Filed: May 13, 2020

(65) Prior Publication Data
US 2020/0364407 A1 Nov. 19, 2020

(30) Foreign Application Priority Data

May 14, 2019 (KR) .................. 10-2019-0056169
Apr. 3, 2020 (KR) .................. 10-2020-0040780

(51) Int. Cl.
*G06K 9/62* (2022.01)
*G06N 3/04* (2006.01)
(Continued)

(52) U.S. Cl.
CPC .......... *G06F 40/30* (2020.01); *G06F 40/279* (2020.01); *G06N 3/0454* (2013.01); *G06N 3/08* (2013.01)

(58) Field of Classification Search
CPC .......... G06K 9/62; G06N 3/04; G06N 20/00
See application file for complete search history.

(56) References Cited

U.S. PATENT DOCUMENTS 11,200,452 B2* 12/2021 Van Der Stockt ... G06K 9/6215
2018/0165554 A1* 6/2018 Zhang .................. G06N 7/005
(Continued)

FOREIGN PATENT DOCUMENTS

JP          2018-206424 A    12/2018
KR          10-1580152 B1    1/2016
(Continued)

OTHER PUBLICATIONS

Liu et al., "Recurrent Neural Network for Text Classification with Multi-Task Learning", May 17, 2016, arXiv:1605.05101v1, pp. 1-7 (Year: 2016).*

(Continued)

*Primary Examiner* — Shreyans A Patel
(74) *Attorney, Agent, or Firm* — NSIP Law

(57) ABSTRACT

According to an aspect of an embodiment, a method for a text classification using multi-task learning executed by a server, the method includes: a step of generating text classification learning data by executing a pre-processing process on raw data collected through a network; a step of learning a category classification in a first classification system preset through a first text classification model using the text classification learning data as an input; a step of learning a category classification in a second classification system preset through a second text classification model using the text classification learning data as an input; and a step of classifying the category in the second classification system by inputting text data received from a user terminal into the second text classification model.

15 Claims, 6 Drawing Sheets

(51) Int. Cl.
*G06N 20/00* (2019.01)
*G06F 40/30* (2020.01)
*G06N 3/08* (2006.01)
*G06F 40/279* (2020.01)

(56) References Cited

U.S. PATENT DOCUMENTS

2020/0019767 A1   1/2020  Porter et al.
2020/0019769 A1*  1/2020  Leibovitz .............. G06K 9/6271
2020/0202181 A1*  6/2020  Yadav .................. G06K 9/6281
2020/0250274 A1*  8/2020  Tan ........................ G06N 20/00
2020/0327445 A1* 10/2020  Yu .......................... G06F 16/353
2020/0342348 A1* 10/2020  Kenny .................. G06N 20/00
2020/0364407 A1* 11/2020  Lee ....................... G06N 3/0481
2020/0401855 A1* 12/2020  Kim ..................... G06K 9/6277

FOREIGN PATENT DOCUMENTS

KR         10-1860472 B1    5/2018
KR  10-2018-0119939 A   11/2018
KR         10-2015218 B1   10/2019
KR         10-2060176 B1   12/2019

OTHER PUBLICATIONS

Conference Handbook, The Web Conference 2019, May 13-17, 2019, San Francisco, CA, USA, 70 pages.

* cited by examiner

FIG. 5

Large-scale classification performance on the ODP dataset (2,735 categories)

|          | Mi-$F_1$ | Ma-$F_1$ |
|---|---|---|
| MC [23]      | 0.486 | 0.426 |
| CNN [17]     | 0.528 | 0.413 |
| LSTM [15]    | 0.430 | 0.316 |
| BiLSTM       | 0.495 | 0.376 |
| PV [22]      | 0.337 | 0.234 |
| fastText [14]| 0.460 | 0.371 |
| MT-DNN [27]  | 0.373 | 0.260 |
| MT-CNN [7]   | 0.512 | 0.435 |
| FS-LSTM [26] | 0.545 | 0.413 |
| SP-LSTM [26] | 0.541 | 0.418 |
| SPG-CNN      | 0.556 | 0.448 |

FIG. 6

Classification performance on the NYT dataset
(2,735 categories)

| | Precision at $k$ | | | | |
|---|---|---|---|---|---|
| | 1 | 2 | 3 | 4 | 5 |
| $CNN$ [17] | 0.325 | 0.279 | 0.231 | 0.208 | 0.193 |
| $LSTM$ [15] | 0.225 | 0.221 | 0.189 | 0.177 | 0.175 |
| $BiLSTM$ | 0.308 | 0.275 | 0.219 | 0.204 | 0.200 |
| $PV$ [22] | 0.208 | 0.171 | 0.161 | 0.150 | 0.138 |
| $fastText$ [14] | 0.292 | 0.296 | 0.281 | 0.260 | 0.242 |
| $MT\text{-}DNN$ [27] | 0.383 | 0.317 | 0.300 | 0.285 | 0.272 |
| $MT\text{-}CNN$ [7] | 0.417 | 0.354 | 0.333 | 0.325 | 0.310 |
| $FS\text{-}LSTM$ [26] | 0.292 | 0.296 | 0.281 | 0.260 | 0.242 |
| $SP\text{-}LSTM$ [26] | 0.325 | 0.288 | 0.281 | 0.267 | 0.262 |
| $SPG\text{-}CNN$ | 0.458 | 0.392 | 0.353 | 0.325 | 0.312 |

FIG. 7

Training time for a single epoch on ODP dataset
compared to multi-task learning models

| | Training time | Mi-$F_1$ | Ma-$F_1$ |
|---|---|---|---|
| $MT\text{-}DNN$ [27] | 2h 7m | 0.373 | 0.260 |
| $MT\text{-}CNN$ [7] | 3h 34m | 0.512 | 0.435 |
| $FS\text{-}LSTM$ [26] | 5h 3m | 0.545 | 0.413 |
| $SP\text{-}LSTM$ [26] | 5h 17m | 0.541 | 0.418 |
| $SPG\text{-}CNN$ | 4h 12m | 0.556 | 0.448 |

METHOD AND SERVER FOR TEXT CLASSIFICATION USING MULTI-TASK LEARNING

CROSS-REFERENCE TO RELATED APPLICATION

This application claims the benefit under 35 USC 119(a) of Korean Patent Applications No. 10-2020-0040780 filed on Apr. 3, 2020, and No. 10-2019-0056169 filed on May 14, 2019, in the Korean Intellectual Property Office, the entire disclosures of which are incorporated herein by reference for all purposes.

BACKGROUND

1. Field

The present disclosure relates to a method for classifying a given text into categories using a multi-task learning framework, and more particularly, to a method for simultaneously learning text classification tasks of different scales by utilizing a deep learning-based multi-task learning framework, and classifying texts therethrough.

2. Description of the Related Art

As a deep learning technique brings great advances in a computer vision system, research on a natural language processing system using the deep learning is also rapidly progressing. In particular, a text classification technique, which is a core in the natural language processing system, achieves a great performance improvement through the deep learning technique. However, in a large-scale text classification task having thousands and tens of thousands of categories to be classified, the deep learning technique is showing poor performance due to a lack of learning documents per category and an imbalance in an amount of learning data between categories.

For the large-scale text classification, categories of the large-scale classification system have been expressed by using an explicit expression model. This method shows stable performance while sharing learning data by using a tree structure of categories, but has a problem that the performance is dependent on an associated knowledge base. In addition, the explicit expression model has a disadvantage that it may not calculate semantic similarity between different words. On the other hand, an implicit expression model capable of calculating the semantic similarity between words and sentences such as deep learning and embedding has utilized the multi-task learning to share the learning data. However, the technique for the deep learning-based multi-task learning also showed great performance improvement in the small-scale text classification task that classifies the text into at least 2 to dozens of categories, but the large-scale text classification tasks of thousands and tens of thousands were unable to share data effectively. To overcome this limitation, if there is a learning method for the deep learning that may share data even in the large-scale classification system, the deep learning technique showing strong performance may be used for the large-scale text classification task.

TECHNICAL LITERATURE

Patent Literature

Korean Patent Registration No. 10-1860472 (Title of the Invention: TEXT CLASSIFIER BASED ON OPEN DIRECTORY PROJECT, APPARATUS AND METHOD OF GENERATION AND CLASSIFICATION FOR TEXT CLASSIFIER)

SUMMARY

Provided are to solve the above-mentioned problems, and a method for effectively classifying a text by calculating semantic similarity between words.

In addition, an object of the disclosure is to solve the problem of lack of learning data by sharing learning data in text classification tasks having different scales.

However, a technical problem to be solved by the present example is not limited to the technical problem as described above, and other technical problems may exist.

Additional aspects will be set forth in part in the description which follows and, in part, will be apparent from the description, or may be learned by practice of the presented embodiments.

According to an aspect of an embodiment, a method for a text classification using multi-task learning executed by a server, the method includes: a step of generating text classification learning data by executing a pre-processing process on raw data collected through a network; a step of learning a category classification in a first classification system preset through a first text classification model using the text classification learning data as an input; a step of learning a category classification in a second classification system preset through a second text classification model using the text classification learning data as an input; and a step of classifying the category in the second classification system by inputting text data received from a user terminal into the second text classification model. The first text classification model and the second text classification model are learned by sharing a feature used for the category classification generated from a shared layer through a multi-task learning framework based on an artificial neural network. The first classification system and the second classification system are generated by using category data based on an open directory project (ODP).

According to an aspect of another embodiment, a text classification server using multi-task learning, the server includes: a memory in which a text classification program using multi-task learning is stored; and a processor executing the program stored in the memory. The processor generates text classification learning data by executing a pre-processing process on raw data being collected through a network by execution of the program, learns the category classification in a first classification system preset through a first text classification model by using the text classification learning data as an input, learns the category classification in a second classification system preset through a second text classification model by using the text classification learning data as an input, and classifies the category in the second classification system by inputting text data received from a user terminal into the second text classification model. The first text classification model and the second text classification model are learned by sharing a feature used for the category classification generated from a shared layer through a multi-task learning framework based on an artificial neural network. The first classification system and the second classification system are generated by using category data based on an open directory project (ODP).

According to any one of the problem solving means of the present application described above, it is possible to obtain a learning data enhancement effect in a large-scale text classification where there is lack of learning documents.

Since the present disclosure applies a method of multi-task learning to a convolution neural network suitable for the large-scale text classification and solves the problems of the present disclosure described above, it shows a higher classification accuracy with less learning and classification times than those of a Recurrent neural network. Therefore, there is an advantage of being able to take both efficiency and effectiveness in the large-scale text classification.

BRIEF DESCRIPTION OF THE DRAWINGS

These and/or other aspects will become apparent and more readily appreciated from the following description of the embodiments, taken in conjunction with the accompanying drawings in which:

FIG. 5 is a table illustrating results of a classification experiment when the method for a text classification using multi-task learning is applied to open directory project test data according to an example of the present disclosure;

FIG. 6 is a table illustrating results of an experiment when the method for a text classification using multi-task learning is applied to an actual news article classification according to an example of the present disclosure; and FIG. 7 is a table of learning times taken when a text classification model is learned with open directory project learning data in the method for a text classification using multi-task learning according to an example of the present disclosure.

DETAILED DESCRIPTION

Figure 1:
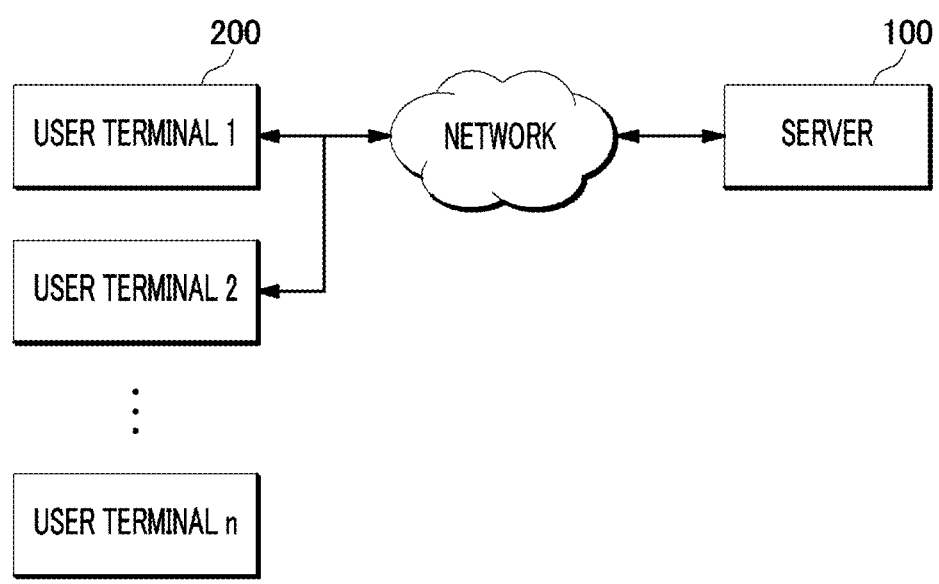
FIG. 1 is a block diagram illustrating a configuration of a text classification system using multi-task learning according to an example of the present disclosure.

Hereinafter, examples of the present application will be described in detail with reference to the accompanying drawings so that those skilled in the art to which the present application pertains may easily practice. However, the present application may be implemented in various different forms and is not limited to the examples described herein. In addition, in order to clearly describe the present application in the drawings, portions irrelevant to the description are omitted, and like reference numerals are assigned to similar portions throughout the specification.

Throughout the present specification, when a portion is "connected" to another portion, this includes not only "directly connected" but also "electrically connected" with another element therebetween.

Throughout the present specification, when one member is positioned "on" another member, this includes not only a case where one member is in contact with another member, but also a case where further another member exists between the two members.

Hereinafter, an example of the present disclosure will be described in detail with reference to the accompanying drawings.

FIG. 1 is a block diagram illustrating a configuration of a text classification system using multi-task learning according to an example of the present disclosure.

The method for a text classification using multi-task learning may be implemented in a server 100 or a user terminal 200. In the method for a text classification using multi-task learning, raw data collection may be performed in the user terminal 200. A process of learning and classifying a text classification model is performed in the server 100, and a classified result may be provided to the user terminal 200. Each of a plurality of users may implement the method for a text classification using multi-task learning through his/her own user terminal 200.

Figure 2:
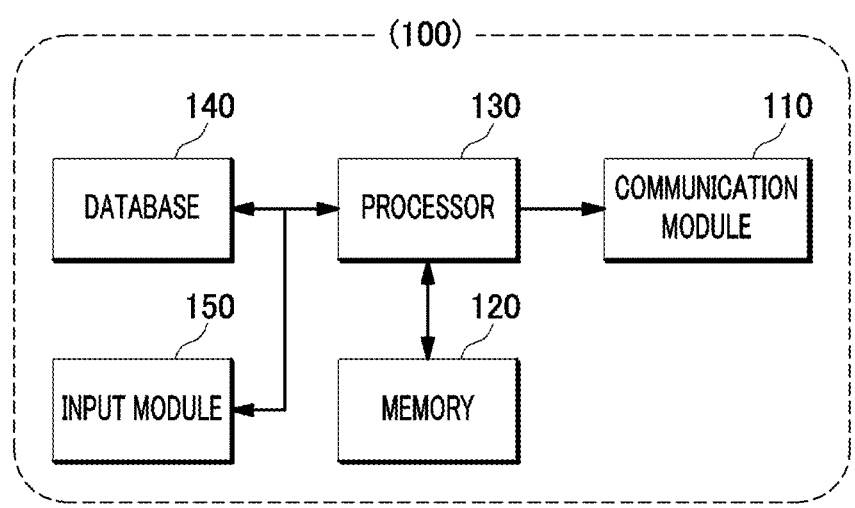
FIG. 2 is a block diagram illustrating a configuration of a text classification server using multi-task learning according to an example of the present disclosure.

FIG. 2 is a block diagram illustrating a configuration of a text classification server using multi-task learning according to an example of the present disclosure.

As illustrated in the drawing, the text classification server 100 using the multi-task learning may include a communication module 110, a memory 120, a processor 130, a database 140, and an input module 150.

The communication module 110 may transmit and receive data with the coupled user terminal 200. The communication module 110 may be a device including hardware and software necessary for transmitting and receiving a signal such as a control signal or a data signal through wired or wireless connection with another network device.

A text classification program using the multi-task learning is stored in the memory 120. The text classification program using the multi-task learning executes the pre-processing process on raw data being collected through a network to generate text classification learning data, learns the category classification in a first classification system preset through a first text classification model by using the text classification learning data as an input, learns the category classification in a second classification system preset through a second text classification model by using the text classification learning data as an input, and classifies the category in the second classification system by inputting text data received from a user terminal into the second text classification model.

In the memory 120, various types of data generated in an operating system for driving the text classification server 100 using the multi-task learning or in an execution process of a text classification program using the multi-task learning are stored.

In this case, the memory 120 collectively refers to a non-volatile storage device that continuously maintains stored information even when power is not supplied and a volatile storage device that requires power to maintain the stored information.

Also, the memory 120 may execute a function of temporarily or permanently storing data processed by the processor 130. Here, the memory 120 may include magnetic storage media or flash storage media in addition to the volatile storage device that requires power to maintain the stored information, but the scope of the present disclosure is not limited thereto.

The processor 130 executes the program stored in the memory 120, and controls entire processes according to the execution of the text classification program using the multi-task learning. Each operation executed by the processor 130 will be described in more detail later.

The processor 130 may include any kind of device capable of processing data. For example, the processor 130 may mean a data processing device embedded in hardware having a physically structured circuit to execute a function expressed by a code or an instruction included in a program. As described above, as an example of the data processing device embedded in hardware, a device may be provided including a microprocessor, a central processing unit (CPU), a processor core, a multiprocessor, an application-specific integrated circuit (ASIC), a field programmable gate array (FPGA), and the like, but the scope of the disclosure is not limited thereto.

The database 140 stores or provides data required for the text classification system using the multi-task learning under the control of the processor 130. The database 140 may be included as a configuration element separated from the memory 120 or may be built in some area of the memory 120.

Figure 3:
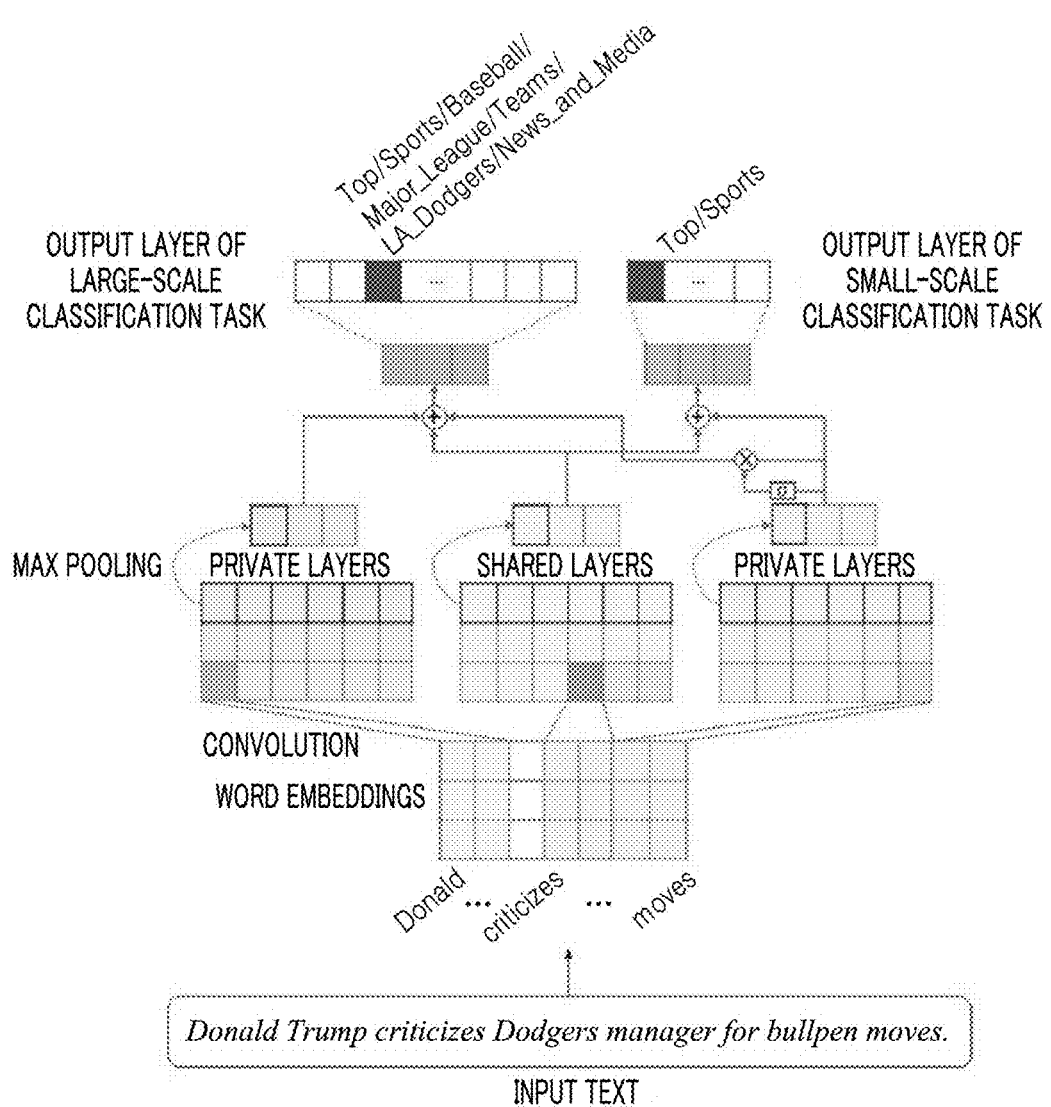
FIG. 3 is a view illustrating a text classification system using multi-task learning according to an example of the present disclosure.

FIG. 3 is a view illustrating a text classification model on a multi-task learning framework based on an artificial neural network in the method for a text classification using multi-task learning according to an example of the present disclosure.

The multi-task used in the text classification model of the present disclosure may be divided into a small-scale classification task and a large-scale classification task. For the large-scale classification task, data of the open directory project (ODP) may be utilized. The open directory project is a web directory that divides the web document into categories using hierarchical ontology and is managed by a community configured of many people. The large-scale classification system for using in the text classification model may be obtained by heuristically removing a too detailed or specific category from all categories of the open directory project. The small-scale classification system may use only a top-level category in the large-scale classification system. For example, in a case where sports, soccer, basketball, volleyball, baseball, pitchers, and the like are used in the large-scale classification system, the small-scale classification system may use sports, which is the top-level category. In the present disclosure, the large-scale classification task and the small-scale classification task may be relative concepts, and the classification system for the small-scale classification task may be a simplified classification system through a task of selecting only an upper concept from the classification system of the large-scale classification task.

In the present disclosure, a first text classification model may be used as the text classification model for the small-scale classification task, and a second text classification model may be used as the text classification model for the large-scale classification task. In this case, the first text classification model for the small-scale classification task and the second text classification model for the large-scale classification task may each have a private layer including its own convolution layer, pooling layer, and complete connection layer. In addition, the first text classification model and the second text classification model may share a word embedding layer, a shared convolution layer, and a shared pooling layer through a shared layer. In addition, in the present disclosure, in order to supplement data sharing using the shared layer, data of the small-scale classification task of the first text classification model expressed from relatively sufficient data using a gate mechanism may be borrowed directly from the large-scale classification task of the second text classification model.

In the process of learning in the text classification model, the input data may be a text to be classified. The input text, which is raw data, may be subjected to a pre-processing process. In the pre-processing process, 'one-hot encoding', which is an expression for representing each word existing in the text, may be used. The one-hot encoding means encoding where only one value is true and all others are false. After this process, a text data type is configured of 0-1, so that it is easy for the computer to recognize and learn.

Next, an expression for the text is generated by connecting an expression corresponding to a word in the input text existing in the vocabulary of the word embedding, and which is calculated in a form of Equation 1 below. In this case, $w_i$ is an expression for words constituting a text, and $w^{1:n}$ is an expression for the text.

$$w_{1:n}=w_1 \oplus w_2 \oplus \ldots \oplus w_n \quad \text{Equation 1}$$

For example, in the text classification model of the present disclosure, when a text such as "Donald Trump criticizes Dodgers manager for bullpen moves" is input, each word in the sentence may be expressed as one vector using a word embedding technique such as Word2Vec. Donald→$W_1$, Trump→$W_2$, . . . , and moves→W8, and the expression of "Donald Trump criticizes Dodgers manager for bullpen moves." becomes $W_{1:8}$. Also, forms such as Donald= [1,0,0, . . . , 0], Trump=[0,1,0, . . . ,0], and criticizes= [0,0,1, . . . ,0] . . . may be displayed through the one-hot encoding.

In the present disclosure, a composite product neural network showing high performance in the computer vision field and the text classification task may be applied to the text expression, and synthesis with the text expression may be calculated through Equation 2 below. In this case, f and b represent a filter and a bias respectively used in the convolution neural network. Such a convolution neural network may serve to extract features from the input text.

$$c_i = \text{ReLU}(f \cdot w_{i:i+h-1}+b) \quad \text{Equation 2}$$

In order to pull out only a most meaningful feature among the extracted features, a max pooling operation is applied, and the calculation may be performed as in Equation 3 below.

$$\hat{c}=\max\{c\} \quad \text{Equation 3}$$

The features extracted by the pooling are all concatenated finally to make a feature vector through a composite product, and which may be expressed as Equation 4.

$$z=[\hat{c}_1, \hat{c}_2, \ldots, \hat{c}_m] \quad \text{Equation 4}$$

In the present disclosure, in order to solve the problem of lack of learning data existing in the large-scale classification task, a feature vector of each of the large-scale classification task and the small-scale classification task is generated through a text classification model, that is, the multi-task learning framework based on the convolution neural network. The small-scale classification task and the large-scale classification task share the word embedding layer, the shared convolution layer, and the shared pooling layer through the shared layer, and each has its own private layer including its own convolution layer, pooling layer, and fully connected layer. The shared layer allows the small-scale classification task and the large-scale classification task to share features that are useful to each other, but the useful features are not fully shared. Therefore, a gate mechanism is used so that the small-scale classification task expressed from relatively sufficient data is directly borrowed from the large-scale classification task, and which may be expressed as in Equation 5 below.

$$g=\sigma(W_{s \rightarrow l} z_s + b_{s \rightarrow l}) \quad \text{Equation 5}$$

In this case, $W_{s \rightarrow l}$ and $b_{s \rightarrow l}$ are a weight and a deviation to be learned, respectively, and σ is a sigmoid activation function. $z_s$ is a peculare feature of the small-scale classification task.

Therefore, the final features of the small-scale classification task and the large-scale classification task generated through the gate mechanism and the multi-task learning structure may be expressed as in Equation 6 below. In this case, $z_{sh}$ is a feature generated from the shared layer, and $z'_s$ and $z'_l$ are the final features of the small-scale classification task and the large-scale classification task, respectively.

$$z'_s = z_s + z_{sh}$$

$$z'_l = z_l + z_{sh} + g \odot z_s \quad \text{Equation 6}$$

In an end layer of each task, and $z'_s$ and $z'_l$ are put into a fully concatenated softmax layer, and each task outputs a predicted probability distribution for each category, and which may be expressed as Equation (7) below. $\hat{y}_l$ and $\hat{y}_s$ are prediction results of the large-scale classification task and the small-scale classification task, respectively.

$$\hat{y}_l = \text{softmax}(W_l z'_l + b_l)$$

$$\hat{y}_s = \text{softmax}(W_s z'_s + b_s) \quad \text{Equation 7}$$

Learning is processed in a direction of obtaining a loss and minimizing the loss through a cross-entropy between the predicted distribution and an actual correct answer distribution. The calculation may be made through Equation 8 below. In this case, $\lambda_l$ and $\lambda_r$ are weights assigned to the loss of the large-scale classification task and the small-scale classification task.

$$\Phi = \lambda_l L(\hat{y}_l, y_l) + \lambda_s L(\hat{y}_s, y_s) \quad \text{Equation 8}$$

As an input text example in the present disclosure, in a case where "Donald Trump criticizes Dodgers manager for bullpen moves." is entered, when the first three words (Donald Trump criticizes) are processed, the first text classification model for the small-scale classification task returns Top/Society, and the second text classification model for the large-scale classification task returns Top/Society/Issues/Warfare_and_Conflict. After the last word is analyzed, the first text classification model for the small-scale classification task returns Top/Sports, and the second text classification model for the large-scale classification task returns Top/Sports/Baseball/Major_League/Teams/Los_Angeles_Dodgers/News_and_Media.

Figure 4:
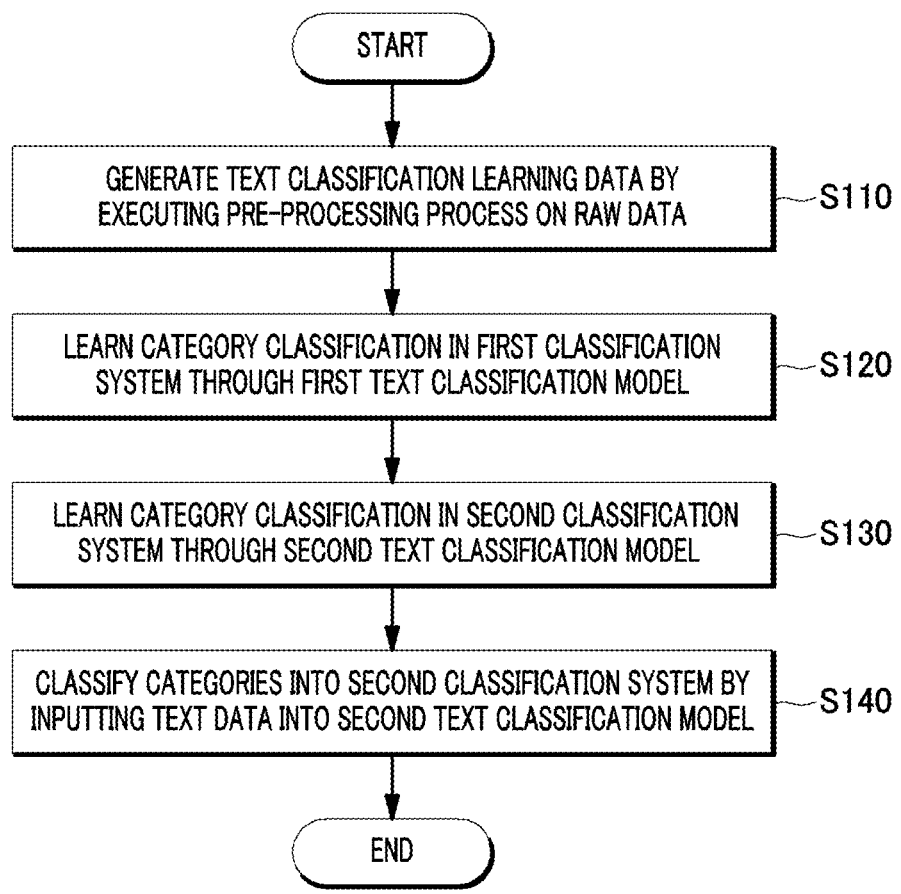
FIG. 4 is a flowchart illustrating a method for a text classification using multi-task learning according to an example of the present disclosure.

FIG. 4 is a flowchart illustrating a method for a text classification using multi-task learning according to an example of the present disclosure.

The processor 130 generates text classification learning data by executing a pre-processing process on raw data collected through a network (S110).

The pre-processing process may generate an expression for the text using one-hot encoding in which a value of 1 is assigned to the index of the text to be expressed and 0 is assigned to the index of the remaining text.

The processor 130 learns category classification in the first classification system preset through the first text classification model using the text classification learning data as the input (S120).

The processor 130 learns the category classification in the second classification system preset through the second text classification model using the text classification learning data as the input (S130).

The first text classification model and the second text classification model may be learned through a convolution neural network (CNN). The text classification may be done in a variety of neural networks, including the Recurrent neural network, the convolution neural network, and the multi-tasking neural network. The present disclosure applies the method for the multi-task learning to the convolution neural network, so that it may show higher classification accuracy than that of the existing Recurrent neural network while reducing the learning and classification time.

Results of the performance test of the text classification model of the present disclosure are as illustrated in FIGS. 5 to 7.

FIG. 5 is a table illustrating the results of classification experiments when the present disclosure is applied to open directory project test data. The performance evaluation scales are Micro-F1 score and Macro-F1 score. The F1 score is a harmonized average of an accuracy rate and a reproducibility rate, the Micro-F1 score is an average of the F1 scores for the entire test documents, and the Macro-F1 score is an average of the F1 scores for respective categories From the table, it may be confirmed that it is effective to perform the large-scale classification through the method for the text classification of the present disclosure rather than various existing neural networks or multi-task neural networks.

FIG. 6 is a table illustrating results of experiments when the present disclosure is applied to a real news article classification. The performance evaluation scale is precision@k. For the precision@k, three scorers score three evaluation criteria (related, slightly related, unrelated) for top k categories output by a classifier. From the table, it may be confirmed that even in the actual news article classification, it may be confirmed that it is effective to perform the large-scale classification through the method for the text classification of the present disclosure rather than various existing neural networks or multi-task neural networks.

FIG. 7 is a table illustrating a learning time taken when the present disclosure is learned with the open directory project learning data. The learning time was measured based on one epoch, and from the table, it may be confirmed that the method for the text classification of the present disclosure is also excellent in performance and efficiency.

Returning to FIG. 4 again, the second text classification model may use the gate mechanism to share the features used for the category classification generated in the first text classification model. In this case, the gate mechanism may use the weight and deviation to be learned, and the sigmoid activation function to share the features used for the category classification generated in the first text classification model to the second text classification model.

The processor 130 classifies the category in the second classification system by inputting the text data received from the user terminal into the second text classification model (S140). The categories may be classified in the large-scale classification task by using the learned text classification model.

The present disclosure uses the multi-task learning framework based on CNN to process the large-scale text classification, and in particular, may utilize the gate mechanism to selectively utilize useful functions of the small-scale classification task. The present disclosure may be configured of two steps of first converting the large-scale classification task to the small-scale classification task, and then simultaneously learning the small-scale and large-scale classification tasks by using the text classification model based on the multi-task learning model, with the gate mechanism. This enables faster and more accurate classification even in the large-scale classification task where there is lack of learning data.

One example of the present disclosure may also be implemented in a form of a recording medium including an instruction executable by a computer, such as a program module being executed by a computer. The computer readable medium may be any available medium that may be accessed by a computer and includes all volatile and nonvolatile media, and separable and non-separable media. In addition, the computer readable medium may include a computer storage medium. The computer storage medium includes all volatile and nonvolatile, separable and non-separable media implemented in any method or technique for storage of information such as a computer readable instruction, a data structure, a program module, or other data.

Although the methods and systems of the present disclosure have been described in connection with specific examples, some or all of configuration elements or operations may be implemented by using a computer system having a general purpose hardware architecture.

The foregoing description of the present application is for illustration, and those skilled in the art to which the present application pertains will understand that it is possible to easily modify to other specific forms without changing the technical spirit or essential features of the present application. Therefore, it should be understood that the examples described above are illustrative in all respects and not restrictive. For example, each configuration element described as a single type may be implemented in a distributed manner, and similarly, the configuration element described as distributed may be implemented in a combined form.

The scope of the present application is indicated by the claims below, rather than the detailed description, and it should be interpreted that all changes or modifications derived from the meaning and scope of the claims and equivalent concepts thereof are included in the scope of the present application.

The invention claimed is:

1. A method for a text classification using multi-task learning executed by a server, the method comprising:
   (a) a step of generating text classification learning data by executing a pre-processing process on raw data collected through a network;
   (b) a step of learning a category classification in a first classification system preset through a first text classification model using the text classification learning data as an input;
   (c) a step of learning a category classification in a second classification system preset through a second text classification model using the text classification learning data as an input; and
   (d) a step of classifying the category in the second classification system by inputting text data received from a user terminal into the second text classification model,
   wherein the first text classification model and the second text classification model are learned by sharing a feature used for the category classification generated from a shared layer through a multi-task learning framework based on an artificial neural network, and
   wherein the first classification system and the second classification system are generated by using category data based on an open directory project (ODP).

2. The method for a text classification using multi-task learning according to claim 1,
   wherein the pre-processing process generates an expression for a text by using one-hot encoding in which a value of 1 is assigned to an index of a text to be expressed and 0 is assigned to an index of the remaining text.

3. The method for a text classification using multi-task learning according to claim 1,
   wherein the first text classification model and the second text classification model are learned through a convolution neural network (CNN).

4. The method for a text classification using multi-task learning according to claim 1,
   wherein the second text classification model shares a feature used for the category classification generated in the first text classification model by using a gate mechanism.

5. The method for a text classification using multi-task learning according to claim 4,
   wherein the gate mechanism shares, with the second text classification model, the feature used for the category classification generated in the first text classification model by using a weight and a deviation to be learned, and a sigmoid activation function.

6. The method for a text classification using multi-task learning according to claim 1,
   wherein the step (b) and step (c) further include a step of obtaining a loss through a cross entropy between a category classification distribution predicted through the first text classification model and the second text classification model, and an actual category classification distribution, and learning the category classification to minimize the loss.

7. The method for a text classification using multi-task learning according to claim 1,
   wherein the second classification system is configured of a category for a classification task of a predetermined scale or more, and the first classification system is configured by using only a top level category of the second classification system.

8. A text classification server using multi-task learning, comprising:
   a memory in which a text classification program using multi-task learning is stored; and
   a processor executing the program stored in the memory,
   wherein the processor generates text classification learning data by executing a pre-processing process on raw data being collected through a network by execution of the program, learns the category classification in a first classification system preset through a first text classification model by using the text classification learning data as an input, learns the category classification in a second classification system preset through a second text classification model by using the text classification learning data as an input, and classifies the category in the second classification system by inputting text data received from a user terminal into the second text classification model,
   wherein the first text classification model and the second text classification model are learned by sharing a feature used for the category classification generated from a shared layer through a multi-task learning framework based on an artificial neural network, and
   wherein the first classification system and the second classification system are generated by using category data based on an open directory project (ODP).

9. The text classification server using multi-task learning according to claim 8,
   wherein the pre-processing process generates an expression for a text by using one-hot encoding in which a value of 1 is assigned to an index of a text to be expressed and 0 is assigned to an index of the remaining text.

10. The text classification server using multi-task learning according to claim 8,
wherein the first text classification model and the second text classification model are learned through a convolution neural network (CNN).

11. The text classification server using multi-task learning according to claim 8,
wherein the second text classification model shares a feature used for the category classification generated in the first text classification model by using a gate mechanism.

12. The text classification server using multi-task learning according to claim 11,
wherein the gate mechanism shares, with the second text classification model, the feature used for the category classification generated in the first text classification model by using a weight and a deviation to be learned, and a sigmoid activation function.

13. The text classification server using multi-task learning according to claim 8,
wherein the process obtains a loss through a cross entropy between a category classification distribution predicted through the first text classification model and the second text classification model, and an actual category classification distribution, and learns the category classification to minimize the loss.

14. The text classification server using multi-task learning according to claim 8,
wherein the second classification system is configured of a category for a classification task of a predetermined scale or more, and the first classification system is configured by using only a top level category of the second classification system.

15. A non-transitory computer-readable recording medium in which a computer program for executing the method for a text classification using multi-task learning according to claim 1 is recorded.

* * * * *